F. G. LANE.
KITCHEN SINK.
APPLICATION FILED APR. 7, 1913.

1,071,324.

Patented Aug. 26, 1913.
2 SHEETS—SHEET 1.

Witnesses

Inventor
F. G. Lane.
By
Attorney

F. G. LANE.
KITCHEN SINK.
APPLICATION FILED APR. 7, 1913.

1,071,324.

Patented Aug. 26, 1913.
2 SHEETS—SHEET 2.

Witnesses
R. N. Jones
H. Kay Martin

Inventor
F. G. Lane.
By
Attorney

UNITED STATES PATENT OFFICE.

FREDERICK G. LANE, OF LOS ANGELES, CALIFORNIA.

KITCHEN-SINK.

1,071,324.

Specification of Letters Patent.

Patented Aug. 26, 1913.

Application filed April 7, 1913. Serial No. 759,505.

*To all whom it may concern:*

Be it known that I, FREDERICK G. LANE, a citizen of the United States, residing at Los Angeles, in the county of Los Angeles and State of California, have invented certain new and useful Improvements in Kitchen-Sinks; and I do hereby declare the following to be a full, clear, and exact description of the invention, such as will enable others skilled in the art to which it appertains to make and use the same.

This invention relates to new and useful improvements in sinks, and has for its object to provide a sink which is adapted to be used in flats or small houses wherein it is necessary to limit the amount of space occupied by furnishings.

Another object of my invention is to provide a sink which is adapted to be folded into the wall and be out of sight at all times except when it is desired to use the device.

Still another object of my invention is to provide a sink which is adjustable to different heights of persons using the same.

With the above and other objects in view, I will now proceed to describe my invention in the following specification and accompanying drawings, in which—

Figure 1:
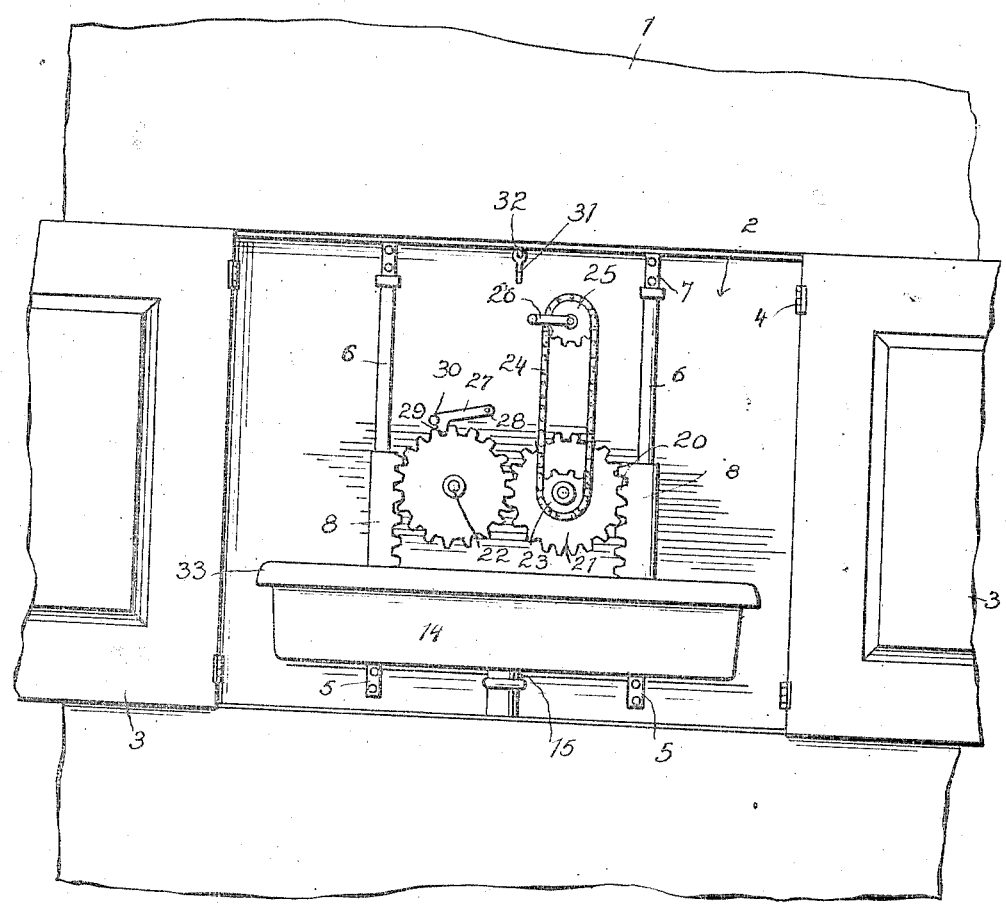
Figure 4:
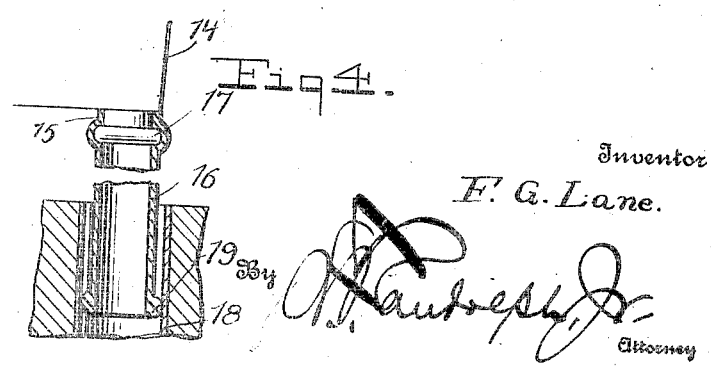
Figure 2:
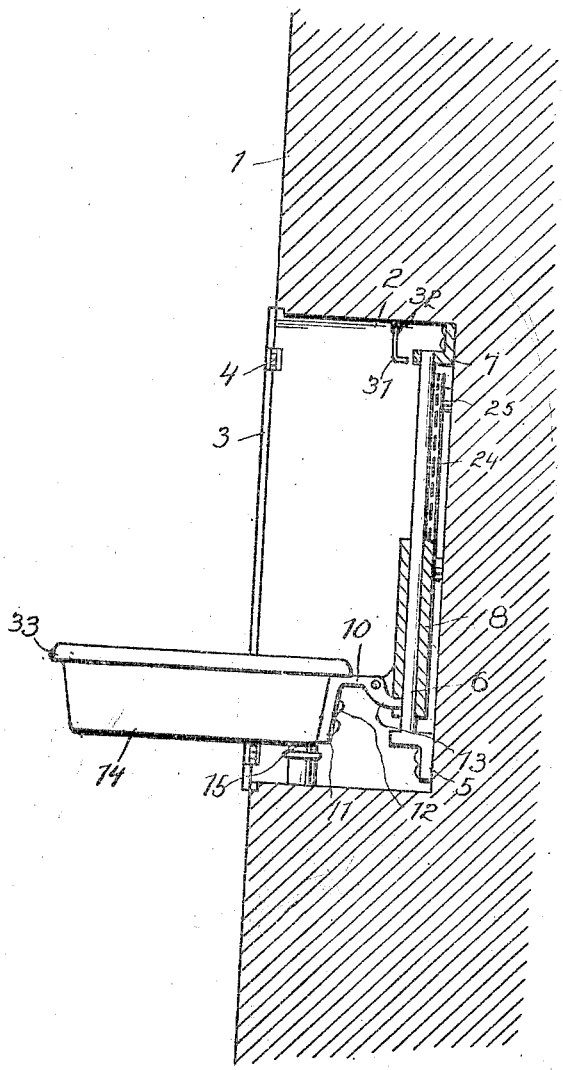
Figure 3:
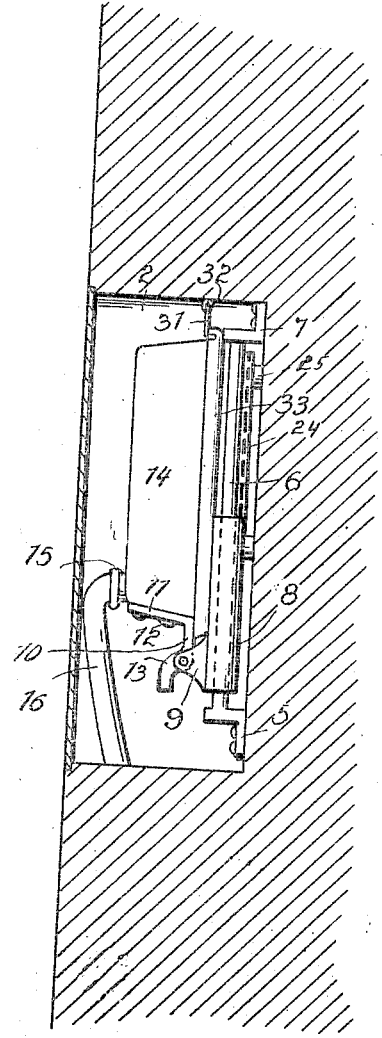

Figure 1 is a front elevation of my improved sink showing the same in place with the doors thrown open and in condition to be used. Fig. 2 is a side view of Fig. 1 partly in section. Fig. 3 is a side view of my improved sink showing the same in its folded position; and Fig. 4 is a detail sectional view of the waste pipe connection.

Referring to the drawings by characters of reference, 1 indicates the wall of a room which is provided with a recess 2. This recess is closed by means of doors 3 preferably hinged as shown at 4. These doors 3 are adapted to swing outwardly on the hinges 4 and open the recess so that the sink will then appear and may be released and dropped down in position for use.

An angle bracket 5 is preferably attached to the back wall of the recess by means of bolts and supports at its outer extremity a rod 6. This rod 6 extends upwardly and into an aperture formed in a second angle bracket indicated at 7 which is held in place in a similar manner to the method previously described. It will be seen that the rod 6 will be held in a substantially rigid vertical position by means of these angle brackets.

A sleeve 8 is preferably provided having outwardly projecting ears 9 to which is pivotally secured an arm 10 which supports the sink. This arm 10 extends outwardly and downwardly as shown at 11 and is attached to the sink by means of the rivets 12 as clearly illustrated in Fig. 2. The end of this arm 10 opposite the downwardly extending member 11 is preferably extended and bent as shown at 13 to form a stop which is adapted to abut the rod 6 and prevent the outer end of the sink from dropping.

A sink 14 is secured to the arm 10 as previously described and is provided with the usual drain outlet 15. This outlet is connected to a flexible pipe 16 as illustrated at 17. This flexible pipe extends downwardly into the main drain pipe 18 and is provided at its lower end with a rubber gasket 19 which is adapted to slide against the inner wall of the main drain pipe 18 and form a pipe joint to prevent any leakage of gases around the pipe 16 in the space between the walls of the two coacting pipes.

The sleeves 8 are preferably provided on their inner sides with gear teeth as indicated at 20 and are adapted to slide vertically on the bar 6. These gear teeth preferably mesh with spur gear wheels 21 which are adapted to mesh with each other and are rotatably mounted on their respective axles as indicated at 22. The axle of one of the spur gears is preferably provided with a sprocket wheel 23 around which a chain 24 is adapted to pass when the device is in operation. The upper end of the chain 24 is supported on a sprocket wheel 25 which is provided with a crank 26 by means of which the same is rotated. A pawl 27 is pivoted as shown at 28 and is provided with a downwardly extending lug 29 which is adapted to engage between the teeth of one of the gear wheels and hold the same immovable until it is desired to release the wheel. This pawl 27 is provided with a knob or handle 30 by means of which it is adapted to be actuated.

A hook 31 is preferably secured to the top wall of the recess 2 by means of a screw eye 32. This hook is adapted to engage the rim 33 of the sink 14 when the device is in its folded position, as clearly illustrated in Fig. 3 of the drawings.

In operation when it is desired to make use of my sink the doors 3 are opened on the hinges 4 and thrown back against the wall. The hook 31 is then released from the arm 33 of the sink 14 and the sink lowered in the position as shown in Fig. 1. It is held in this lowered position by means of the projection 13 on the arm 10 which abuts the rod 6 and prevents the sink from dropping to a lower position.

Should the party using the sink desire to change the height of the same, the pawl 27 is released from its position in engagement with the gear wheel and the crank 26 rotated thereby causing the sink to rise by means of the gears 21 and the gear teeth on the sleeves 8. This motion causes the flexible tube 16 to slide within the tube 18 and when the desired position is reached the pawl 27 is then allowed to drop back into the teeth of the gear wheel and the device is held immovable.

While in the foregoing I have shown and described the preferred embodiment of my invention, it is to be understood that I may change the structure and arrangement of parts without departing from the spirit and scope of the claims.

What I claim is—

1. In combination with a sink, rods supporting said sink, sleeves slidable on said rods, and means to slide the sleeves vertically.

2. In combination with a sink, rods, sleeves slidable on said rods, means to pivotally connect the sink to the sleeves, and means to adjust the sleeves vertically with relation to the rods.

3. In combination with a sink, rods, sleeves slidable on said rods, an arm pivoted to the sleeves, the said arm fixed to the sink, and gears adapted to slide the sleeves with relation to the rods.

4. In combination with a sink, rods, sleeves slidable on said rods, ears at the lower extremities of said sleeves, arms pivotally mounted on said ears, said arms extending rearwardly and downwardly to form stops, and means at the opposite end of said arms to attach a sink.

5. In combination with a sink, brackets, rods supported between said brackets, sleeves slidable on said rods, ears formed at the lower ends of said sleeves, arms pivotally mounted at the outer extremities of said ears, the said arms extending outwardly and supporting a sink, rack teeth formed on the sleeves substantially at right angles to the ears, and gears meshing with said rack teeth to adjust the sleeves with relation to the rods.

6. In combination with a sink, brackets, rods supported between said brackets, sleeves slidable on the rods, means to pivotally attach a sink to the lower ends of the sleeves, a flexible connection between the sink and a drain pipe, and means to adjust the sink vertically.

7. In combination with a sink, brackets, rods supported between said brackets, sleeves, ears formed at the lower extremities of said sleeves, arms pivotally secured to the ears, said arms extending downwardly and rearwardly to form stops, the opposite ends of said arms being attached to a sink, a drain pipe, a flexible connection between the sink and the drain pipe, and means at the extremity of the flexible connection opposite the sink to form a tight joint.

8. In combination with a sink, brackets, rods supported between said brackets, sleeves slidable on the rods, a sink pivotally connected to the lower extremity of said sleeves, and means to hold the sink in a folded position.

In testimony whereof I affix my signature in presence of two witnesses.

FREDERICK G. LANE.

Witnesses:
B. HARWOOD,
J. M. SAMUELS.